(No Model.)

C. E. WOODS.
CONTINUOUS CURRENT RECTILINEAR MOTOR.

No. 546,691. Patented Sept. 24, 1895.

Witnesses:
George L. Cragg
W. Clyde Jones

Inventor:
Clinton E. Woods
By Barton Brown
Attorneys.

UNITED STATES PATENT OFFICE.

CLINTON E. WOODS, OF CHICAGO, ILLINOIS, ASSIGNOR, BY DIRECT AND MESNE ASSIGNMENTS, TO THE C. E. WOODS COMPANY, OF SAME PLACE.

CONTINUOUS-CURRENT RECTILINEAR MOTOR.

SPECIFICATION forming part of Letters Patent No. 546,691, dated September 24, 1895.

Application filed April 6, 1895. Serial No. 544,735. (No model.)

*To all whom it may concern:*

Be it known that I, CLINTON E. WOODS, a citizen of the United States, residing at Chicago, in the county of Cook and State of Illinois, have invented a certain new and useful Improvement in Continuous-Current Rectilinear Motors, (Case No. 1,) of which the following is a full, clear, concise, and exact description, reference being had to the accompanying drawings, forming a part of this specification.

My invention relates to a continuous-current rectilinear motor; and its object is to provide means whereby a continuous current may be supplied to an electromagnetic element carried upon a vehicle to produce shifting magnetic poles adapted to react upon fixed poles situated along the way or line of travel of the vehicle, whereby the vehicle is propelled forward.

It has been proposed heretofore to provide along the line of travel of the vehicle a number of polar projections or poles of alternate polarity, and to provide upon the vehicle a number of electromagnets, the poles thereof projecting from the vehicle toward the fixed poles provided along the way, switching apparatus being provided upon the vehicle, whereby the electromagnets may be cut into and out of circuit, thus producing magnetic poles adapted to react upon the poles situated along the way, the vehicle being thus propelled forward.

It is the object of my invention to dispense with the cumbersome electromagnets and the complicated switching mechanism and to provide a simple circuit arrangement whereby the poles upon the electromagnetic device carried by the vehicle may be caused to shift to propel the vehicle forward.

In accordance with my invention I provide a number of coils preferably wound upon a magnetic core, the ends of the coils being connected together to form the closed circuit, the ends of the coils being also connected with the segments of a commutator which is adapted to be rotated as the vehicle advances to direct current through the coils, whereby poles are induced which react upon the poles situated along the line of travel to propel the vehicle forward.

I will describe my invention by reference to the accompanying drawings, in which—

Figure 1:
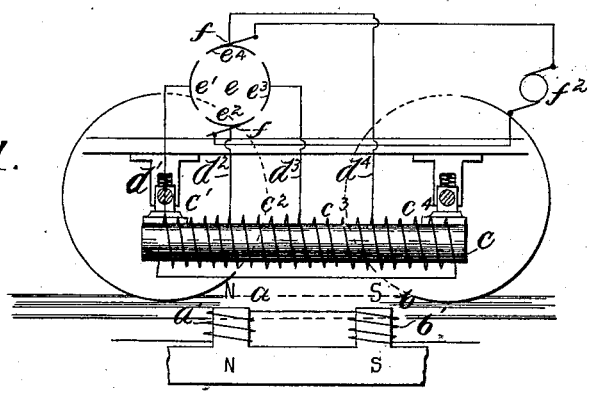
Figure 2:
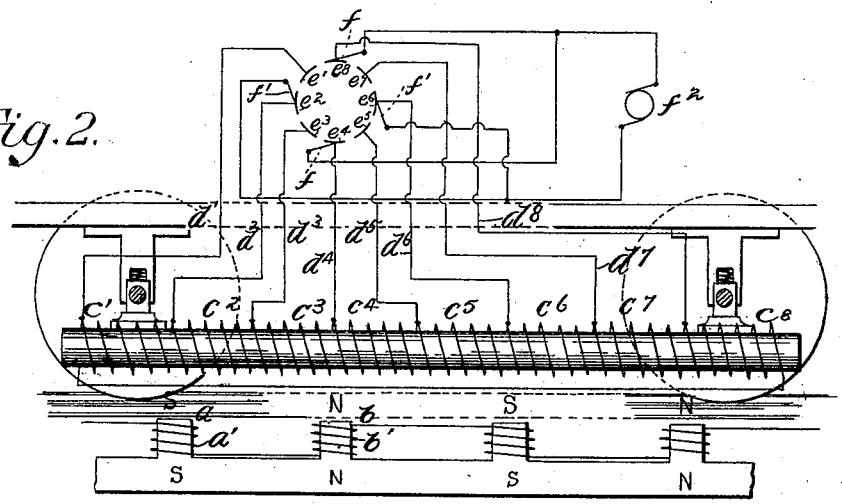
Figure 3:
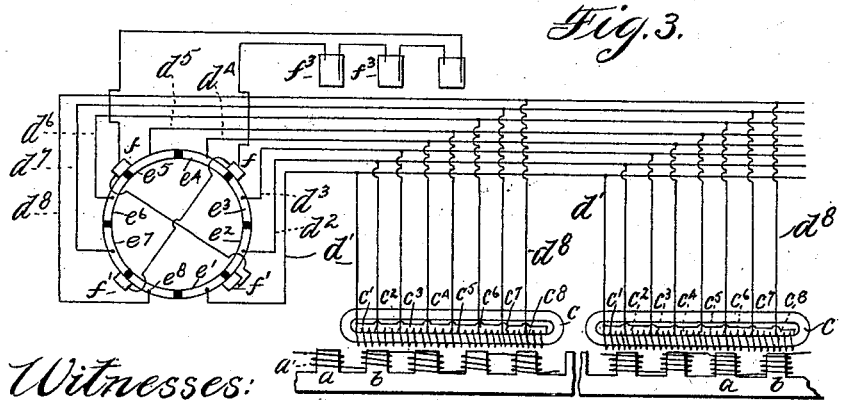
Figure 4:
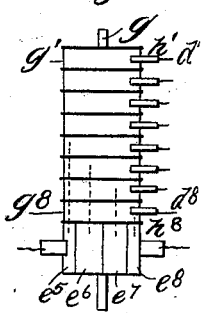

Figure 1 is a diagram illustrating my invention, the electromagnetic element consisting of four coils. Fig. 2 is a similar diagram illustrating an electromagnetic element provided with eight coils. Fig. 3 is a diagram illustrating the manner in which a number of the electromagnetic elements are connected in circuit with a single commutator. Fig. 4 is a detail view illustrating the manner in which the coils are maintained in electrical connection with the segments of the rotating commutator.

Like letters refer to like parts in the several figures.

Along the line of travel are provided polar projections or poles $a\ b$, which may be permanent magnets or may be wound with coils $a'\ b'$, the current traversing the coils in such direction that adjacent poles are of opposite polarity. Upon the vehicle is carried a magnetic core $c$, upon which are wound coils $c'\ c^2\ c^3\ c^4$, the ends of the coils being joined together, thus forming a closed circuit. The ends of the coils are connected by conductors $d'\ d^2\ d^3\ d^4$ with the segments $e'\ e^2\ e^3\ e^4$ of the commutator $e$. Upon the commutator $e$ rest brushes $f\ f$, connected with the opposite sides of a source of electricity $f^2$. The commutator $e$ is adapted to be rotated as the vehicle advances, and current is thus directed through the coils in such direction that poles are developed at the ends of certain of the coils, which react upon the fixed poles along the way, thus propelling the coils forward and carrying with them the vehicle. As the commutator rotates, the circuit connections are changed to change the position of the poles developed by the coils, the poles being thus caused to shift from end to end of the electromagnetic element and causing the forward movement of the same, due to the reaction of the poles. The magnetic core $c$ may be omitted, in which case the coils act as a number of solenoids, but the employment of the core is preferable, since a more powerful action is secured thereby, due to the decreased reluctance of the magnetic circuit.

In Fig. 2 the electromagnetic element carried upon the vehicle is illustrated as comprising eight coils $c'$ to $c^8$, the ends of the coils being connected together and being connected with the segments $e'$ to $e^8$ by means of the conductors $d'$ to $d^8$. Upon the commutator bear brushes $f\,f$, connected with one side of the source of electricity $f^2$, and the brushes $f'\,f'$, connected with the opposite side of said source. Current is thus directed through the coils to produce four magnetic poles, adapted to react upon the fixed poles along the way, instead of two, as illustrated in Fig. 1. As illustrated in Fig. 1, the coils occupy a position in front of two of the fixed poles situated along the way, while in Fig. 2 the coils occupy a position in front of four poles. It is evident that any desired relation between the number of fixed poles and the number of coils may be employed as may be found most desirable, the commutator devices being changed to produce the desired circuit connections.

In Fig. 3 I have illustrated a number of electromagnetic elements connected with the same commutator in parallel, the elements comprising each a number of coils $c'$ to $c^8$, connected together, as in Fig. 2, the ends of the coils being connected with the conductors $d'$ to $d^8$, which extend to the segments $e'$ to $e^8$ of the commutator $e$. Upon the commutator rest brushes $f\,f$ and $f'\,f'$, connected with the opposite sides of the source of electricity, which is illustrated in this figure as a number of storage-batteries $f^3\,f^3$. The corresponding coils of the several electromagnetic elements are thus connected in parallel, and a single commutator directs current through the coils of all the electromagnetic devices alike.

With a magnetic core as illustrated in Figs. 1 and 2 it will be found that sparking will occur at the brushes when the segments connected with the end coils pass beneath the brushes, and to avoid this sparking I have found it desirable to connect the ends of the core together, as illustrated in Fig. 3, thus forming a complete magnetic circuit or ring.

In Fig. 4 I have illustrated the manner in which the conductors $d'$ to $d^8$ are maintained in electrical connection with the respective segments of the commutator $e$. Upon the shaft $g$, upon which the commutator is mounted, are provided a number of rings $g'$ to $g^8$, each of the rings being connected with a particular one of the commutator-segments. Upon the rings $g'$ to $g^8$ rest brushes $h'$ to $h^8$, connected, respectively, with the conductors $d'$ to $d^8$. The conductors are thus maintained in electrical connection with their respective segments on the commutator as the commutator rotates.

Although I have illustrated and described my invention in connection with a vehicle in the form of a street-railway truck, it is equally applicable to other forms of vehicles, as elevators, the present steam railway-cars, and the like.

Having described my invention, what I claim as new, and desire to secure by Letters Patent, is—

1. In a rectilinear motor, the combination with a number of polar projections or poles of alternate polarity situated along the way or line of travel, of a magnetic core mounted upon the vehicle with its axis parallel to the line of travel, said core being wound with a number of coils, the said coils being connected together end to end to form a closed circuit, a commutator with the segments of which the ends of said coils are respectively connected, and brushes bearing upon said commutator and connected with a source of electricity whereby current is directed through the coils to produce changing poles in the magnetic core, adapted to react upon the poles situated along the way to propel the vehicle forward; substantially as described.

2. The combination with a number of polar projections or poles of alternate polarity, situated along the way or line of travel, of a magnetic core mounted upon the vehicle, the ends of said core being joined together to form a complete magnetic circuit or ring, a number of coils wound upon said core, the ends of adjacent coils being united, the end of the first coil being also connected with the end of the last coil to thus form a closed circuit, a commutator, the segments of which are connected respectively with the ends of said coils, and brushes bearing upon said commutator and connected with a source of electricity; substantially as described.

3. The combination with polar projections or poles of alternate polarity arranged along the way or line of travel, of a number of magnetic cores mounted respectively upon a number of vehicles, each of said cores being wound with a number of coils, the ends of the coils upon each of the cores being connected end to end to form a closed circuit, a single commutator with the segments of which corresponding coils wound upon the several cores are connected in parallel, and brushes bearing upon the commutator and connected with a source of electricity, whereby current is directed through the several series of coils, through the agency of a single commutator, and changing magnetic poles are produced in each of the cores adapted to react upon the fixed poles situated along the line of travel to propel the vehicle forward; substantially as described.

In witness whereof I hereunto subscribe my name this 3d day of April, A. D. 1895.

CLINTON E. WOODS.

Witnesses:
JOHN W. SINCLAIR,
W. CLYDE JONES.